United States Patent [19]

Finucane et al.

[11] 4,001,448

[45] Jan. 4, 1977

[54] BEVERAGE MIX AND METHOD OF MANUFACTURING SAME

[75] Inventors: Thomas P. Finucane, Hartsdale, N.Y.; Theodore J. Kovacic, Downers Grove; John R. Wisler, Westmont, both of Ill.

[73] Assignee: General Foods Corporation, White Plains, N.Y.

[22] Filed: Mar. 12, 1975

[21] Appl. No.: 557,702

Related U.S. Application Data

[63] Continuation of Ser. No. 360,212, May 14, 1973, abandoned.

[52] U.S. Cl. .............................. 426/285; 426/590
[51] Int. Cl.² .......................................... A23L 2/00
[58] Field of Search .......... 426/590, 591, 592, 599, 426/285, 453, 74, 588; 424/57; 423/307, 308, 309, 311, 312, 313, 314, 315

[56] References Cited

UNITED STATES PATENTS

| | | | |
|---|---|---|---|
| 2,154,168 | 4/1939 | Klein et al. | 424/57 X |
| 2,216,816 | 10/1940 | Kuever | 424/57 |
| 2,332,735 | 10/1943 | Lyons | 426/190 |
| 2,514,973 | 7/1950 | Robinson | 426/285 X |
| 2,851,361 | 9/1958 | Diller | 426/591 |
| 3,416,930 | 12/1968 | Irani | 426/591 X |
| 3,533,805 | 10/1970 | Nava et al. | 426/285 |
| 3,657,424 | 4/1972 | Atkins et al. | 426/599 X |

Primary Examiner—Robert L. Lindsay, Jr.
Assistant Examiner—Kenneth M. Schor
Attorney, Agent, or Firm—Thaddius J. Carvis; Daniel J. Donovan

[57] ABSTRACT

Monocalcium phosphate containing above 4% dicalcium phosphate by weight thereof conditions the flow of citric or malic acid-based beverage mixes so as to provide a free-flowing and controllably-packageably dry mix.

7 Claims, No Drawings

BEVERAGE MIX AND METHOD OF MANUFACTURING SAME

This is a continuation, of application Ser. No. 360,212, filed May 14, 1973 and now abandoned.

INTRODUCTION

This invention relates to the process whereby a beverage mix which is citric and/or malic acid-based can be formulated into a batched and packageably dry beverage mix.

BACKGROUND OF THE INVENTION

Heretofore prior art workers have used edible food acids, preferably those of the water-soluble variety, such as citric and malic to prepare beverage mixes which will have flavor, coloring and, in some instances, sweeteners such as sugars. Such mixes will commonly be packaged under moderately controlled, low-relative-humidity, ambient room temperature conditions whereby the mix as packaged will be free flowing and respond to variations in the flow properties thereof without undue changes in the physical properties.

However, in the manufacture of such acid-based beverage products, eccentricities do arise and the art does find it useful to apply flow conditioners such as tricalcium phosphates, silicates and the like. Silicates present an insolubility limitation and tricalcium phosphate at high levels introduces a turbidity and insolubles to the preparation which is less preferred when one is striving for a clear reconstituted beverage. Furthermore, by reason of its chemical structure, tricalcium phosphate (TCP) requires a higher level of food acid for a comparable tartness associated with food flavoring and thus adds expense to the beverage mix.

Additional problems are encountered due to the limitations of commercial equipment used to formulate and package powdered mixes based upon hygroscopic ingredients such as citric acid. Normally, a degree of powder will be released to the air and settle on the floor, stairways, railings and equipment. Even with moderate humidity control, the hygroscopic powder tend to pick up moisture during periods of excessive humidity and create undesirable and, in some cases, potentially dangerous, working conditions. Moreover, during these periods of high humidity, the hygroscopic dry ingredients can disrupt the operation of blending equipment such as a v-blender of the type manufactured by Patterson-Kelly. These blenders include a high rpm intensifier bar powered by a shaft projecting into the interior of the blender through a packing. Freezing of the shaft in the packing is sometimes caused due to the hygroscopic ingredients during periods of excessive humidity.

Prior workers have recognized that monocalcium phosphate can be employed for its flavor impact on certain foods and beverages. For example, in U.S. Pat. No. 2,514,973, Robinson employed a high $P_2O_5$ content monocalcium phosphate composition as a partial replacement of fruit acids in beverages. Also, in U.S. Pat. No. 2,851,361, Diller discloses monocalcium phosphate, at a level of less than about 0.5 grams per quart, as a partial acid replacement in carbonated beverages. And, in U.S. Pat. No. 3,030,213, Tidridge et al. discloses the use of monocalcium phosphate with $H_3PO_4$ and $H_2SO_4$ to replace ⅓ to ½ of the food acid in beverages and desserts. It was not recognized, however, that a composition comprising monocalcium phosphate containing above 4% dicalcium phosphate by weight thereof would condition the flow of citric acid based beverage mixes so as to provide a free-flowing and controllably-packageably dry mix.

SUMMARY OF THE INVENTION

In accordance with the present invention, a beverage mix which is based primarily on an edible food acid, selected from the group consisting of citric and malic and mixtures thereof, is formulated to contain added flavors and colors but has also included therein the controlled reaction product of heating limestone and acid to produce monocalcium phosphates and a level of dicalcium phosphate above 4%, preferably in the range of 6–10% by weight of the phosphates and typically in the order of about 8%. The inclusion of this level of dicalcium phosphate provides a flow conditioning to the monocalcium phosphate per se and in combination with the edible food acid, which is prone towards hygroscopicity, even under moderately controlled room temperature air conditioned packaging operation, provides a consistency of binning and packaging in volumetric and other filling operations that meets the strictest requirements for controlled batching of a flavor mix. Moreover, the addition of mono- and dicalcium phosphate agent will greatly diminish the problems associated with the high humidity and the presence of settling of powdered ingredients in the work area. And, the addition of the mono- and dicalcium phosphate agent will help overcome the problem of intensifier bar freezing during periods of high humidity. Advantageously, by virtue of the acid balance in the mono- and dicalcium phosphate mixture, there is obtainable a reduction in the level of acid needed to provide the tartness and other organoleptic response associated with fruit flavored beverage preparations such as strawberry, orange, cherry, raspberry, lemon-lime, black cherry lemonade etc.

BEST MODE

In accordance with its more specific embodiments, the following is a representative formulation for beverage mixes containing the mono- and dicalcium phosphate flow controlling agent:

| INGREDIENTS | PARTS BY WEIGHT |
| --- | --- |
| Citric Acid | 1.79 |
| Monocalcium Phosphate* | 1.50 |
| Ascorbic Acid | 0.055 |
| Strawberry Flavor | 0.027 |
| Strawberry Shade | 0.025 |
| Vitamin A | 0.006 |

*containing 8% dicalcium phosphate by weight of the total ingredients listed as monocalcium phosphate.

Recipe: Put the contents of a 3 gram package into one quart of water with one half cup of sugar and stir to make about 4 servings of eight ounces of beverage.

The foregoing ingredient formulation will provide a flowable, packageable beverage mix which, under normal room temperature and controlled relative humidity packaging conditions throughout seasonal variations, will be desirably free flowing and packageable within close manufacturing tolerances. The mix is preferably packaged in a polyethylene-coated foil pouch.

Dry powders of the type described are relatively dense and, therefore, can be subject to several disadvantages. For example, when packaged in an amount sufficient to supply two quarts of beverage, the package weight is only about 6 grams and the dense powders give the appearance that the package is inadequately filled. This can lead to consumer complaints and even rejection of the product. Additionally, packaging of relatively dense powders often causes a greater material loss to "overpacking" where it is necessary to guarantee a minimum package weight. Moreover, where they are simply dry mixed, the ingredients cannot be conveyed by an air veying system, but must be transported by more complex and costly mechanical means. This is because the air stream used in the pneumatic conveying system tends to classify the particles of different size and density.

Agglomeration of the dry beverage mix has been found to overcome these problems associated with the relatively dense powders. In accordance with this embodiment of the invention the beverage mix is agglomerated by the use of a conventional steam agglomerator known to those skilled in the art. In this embodiment, the monocalcium-dicalcium phosphate provides a remarkable ability to control the agglomerating characteristics of the group of food acids specified herein in that despite variations in steam flow rates and ratios of flow of dry mix ingredients to the agglomerating zone, there is nevertheless provided a consistency of flow such that the agglomerate formed has a minimum of overs and need not be recycled for recovery as a uniform mix having a comparatively narrow particle size distribution. When using the highly hygroscopic acids without the mono- dicalcium phosphate agent of the present invention, agglomeration is impractical.

The beverage mix formulation of the foregoing Example can agglomerate in a typical Blaw-Knox instantizing agglomerating apparatus by causing the mix to flow to and through the agglomerating zone at a mix to steam ratio of about 3 to 1.

In addition to the foregoing representative operative Examples, other formulations are practical within the same inventive spirit and indeed sweetening agents other than sucrose both natural and artificial may be added in major or minor per cent by weight of the total mix ingredients or an artificial sweetener such as saccharin, cyclamate salts, certain dipeptides and their salts as L-aspartyl-L-phenylalanine methyl ester and the like.

Generally speaking, the advance in the art of packaging will be achieved by employing a controlled level of the mono- and dicalcium phosphate agent based on the dry weight of the total mix ranging between 1–65%, the preferred level of use being in the case of non-sugar or non-sweetened mixes 15–50%.

Additionally, it is important to the successful operation of the present invention, in its narrower aspects of providing a highly palatable beverage with reduced acid requirements, that the acids be present within narrowly defined limits. For example, for each one quart of beverage, the mix based upon either citric or malic acids should contain from about 1 to 6, preferably about 1.8, grams of acid and from 1 to 3, preferably about 1.5, grams of the monocalcium-dicalcium phosphate mixture.

A number of modifications and variations will become apparent to those skilled in the art upon reading the above disclosure. It is intended that all such modifications and variations be included within the scope of the present invention which is defined by the following claims.

What is claimed is:

1. The method of manufacturing a free flowing dry beverage mix containing a flavor, a color, and from about 1 to 6 grams of a food acid for each quantity of mix for preparing one quart of beverage, the food acid selected from the class consisting of citric, malic and mixtures thereof, which method comprises: incorporating as an ingredient of the dry beverage mix from about 1 to 3 grams of a mixture of mono-and dicalcium phosphates for each quantity of mix for preparing one quart of beverage, wherein the dicalcium phosphate is present at a level between 4% and 10% by weight of the mixture of phosphates.

2. The method of claim 1 wherein the mixture of phosphates is employed at a level of 15–50%, by weight of the total mix excluding any sugar which may be present.

3. The method of claim 2 wherein the dicalcium phosphate is present at the level of 8% by weight of the total calcium phosphate mixture.

4. The method of claim 3 including the dry ingredients of beverage mix are agglomerated.

5. The method of claim 1 including the step of packaging the mix using volumetric metering equipment.

6. A free flowing dry beverage mix comprising, a flavor, a color, and for each quantity of mix for preparing one quart of beverage: from about 1 to 6 grams of an edible food acid selected from the class consisting of citric, malic and mixtures of citric and malic; and, as a free flowing constituent thereof, having an intimate mixture therewith at least from about 1 to 3 grams of a mixture of mono- and dicalcium phosphates, wherein the dicalcium phosphate is present at a level between 4% and 10% by weight of the mixture of phosphates.

7. The composition of claim 6 wherein the dicalcium phosphate is approximately 8% by weight of the phosphates.

* * * * *